Sept. 2, 1941.  C. E. FRUDDEN ET AL  2,254,360
TRACTOR REAR ASSEMBLY
Original Filed May 17, 1939    3 Sheets-Sheet 1
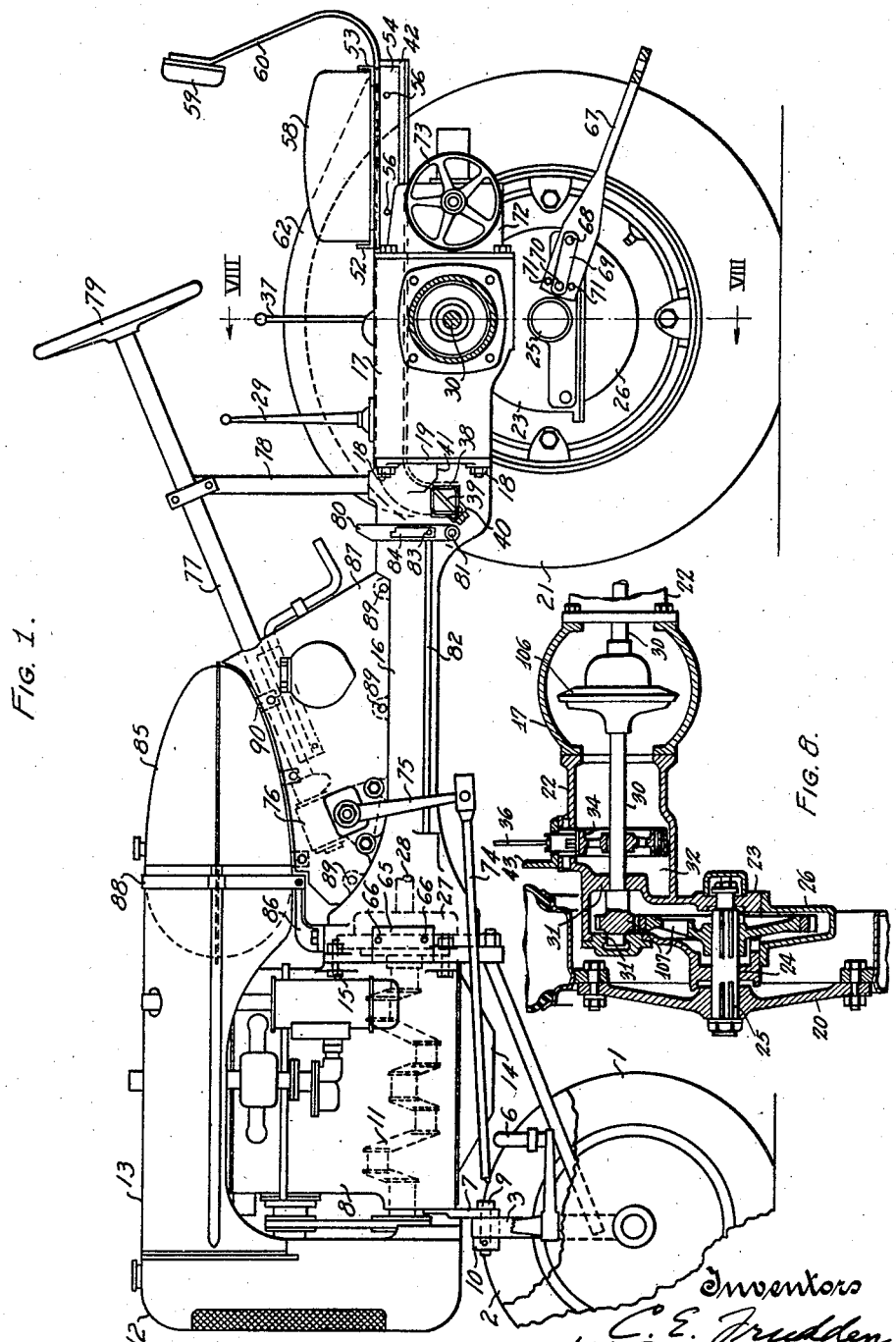

Sept. 2, 1941.  C. E. FRUDDEN ET AL  2,254,360
TRACTOR REAR ASSEMBLY
Original Filed May 17, 1939  3 Sheets-Sheet 2
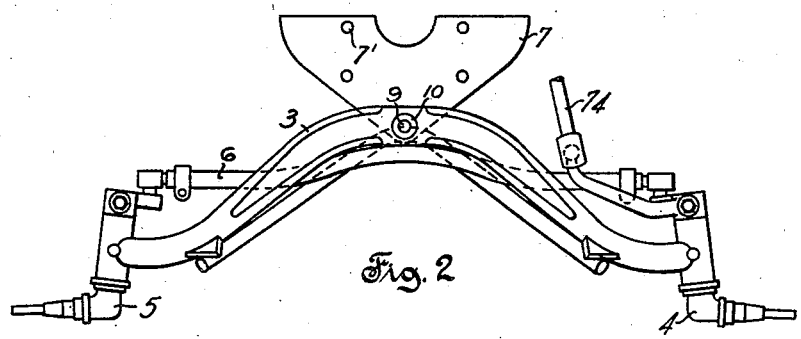
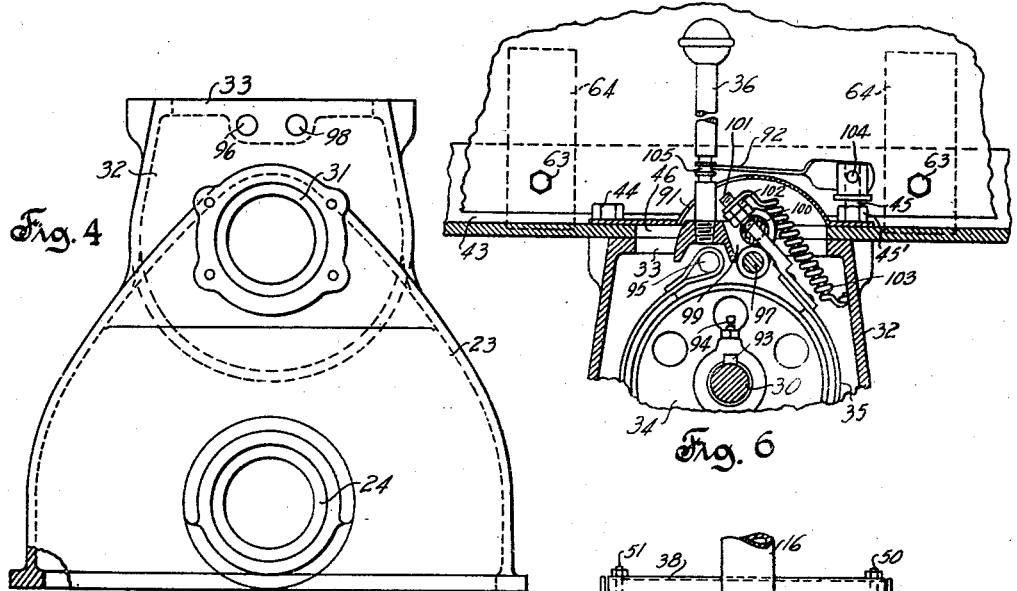
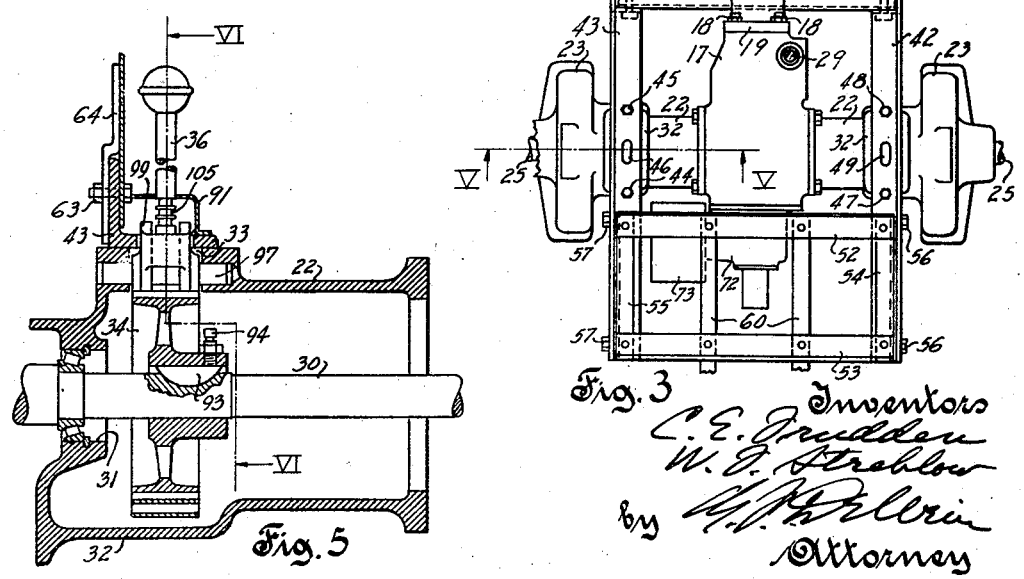

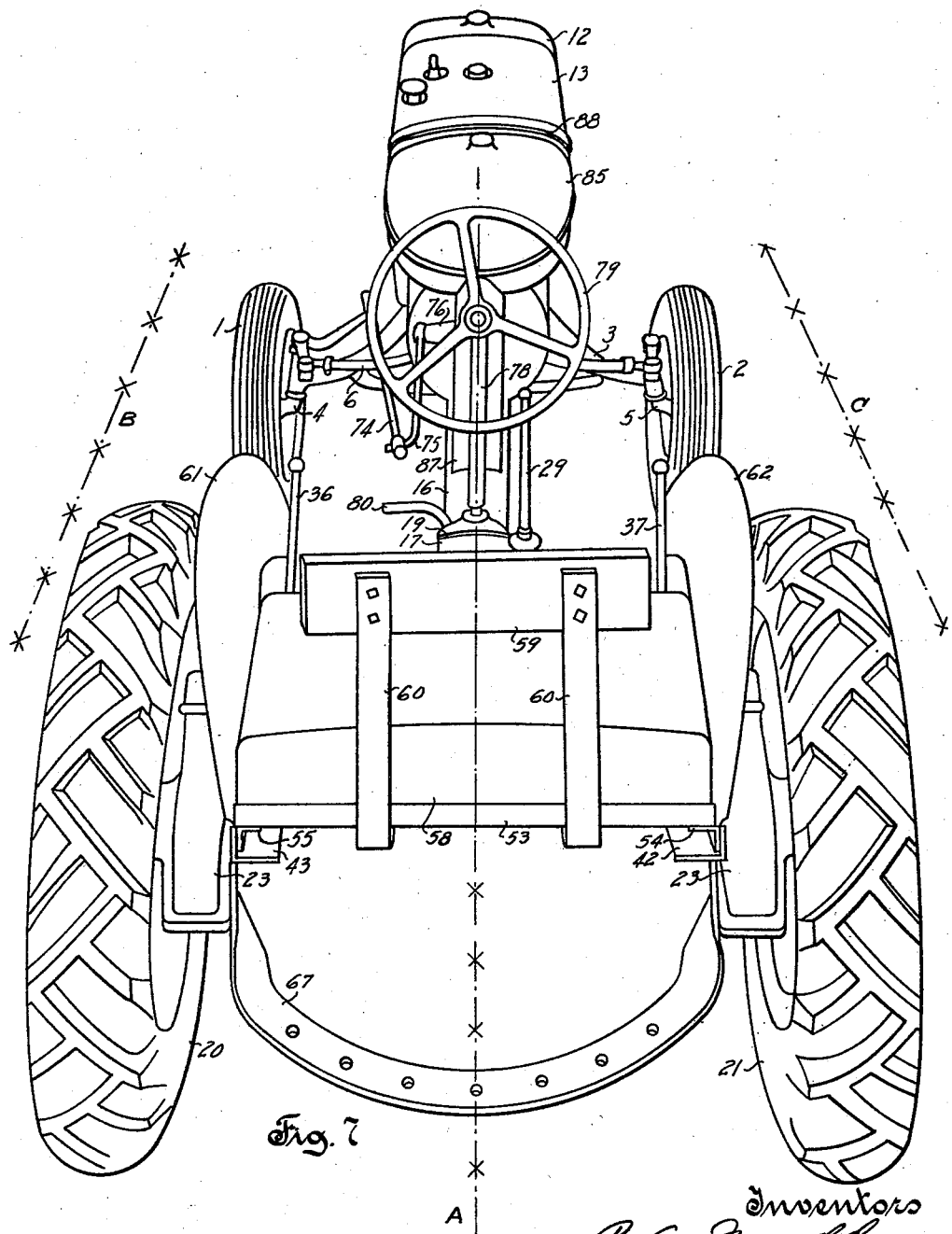

Patented Sept. 2, 1941

2,254,360

UNITED STATES PATENT OFFICE 2,254,360

TRACTOR REAR ASSEMBLY

Conrad E. Frudden and Walter F. Strehlow, Wauwatosa, Wis., assignors to Allis-Chalmers Manufacturing Company, Milwaukee, Wis., a corporation of Delaware Original application May 17, 1939, Serial No. 274,164. Divided and this application February 21, 1940, Serial No. 320,106

9 Claims. (Cl. 180—1)

The invention relates to motor vehicles, and it is concerned more specifically with an improved farm tractor. The present application is a division of application Serial No. 274,164, filed on May 17, 1939, by Conrad E. Frudden and Walter F. Strehlow, for Tractor.

During long periods of continuous operation of a tractor, as in plowing, the driver should be seated comfortably and be able to drive the tractor conveniently in a sitting position, and if the tractor is equipped with front-mounted earth working tools, as in cultivating, the driver should moreover be able to observe the work of the tools from the seat without assuming an uncomfortable position. It is the main object of the invention to provide a tractor of improved construction which meets these requirements.

A more specific object of the invention is to provide an improved rear assembly for a tractor which is constructed to afford a wide range of forward vision from the driver's seat, the range of forward vision being preferably such as to include a plant row extending centrally between the transversely spaced rear wheels of the tractor and particularly a portion of such plant row between the front and rear ends of the tractor.

Another object of the invention is to provide an improved fender and seat equipment for a tractor. The improved equipment, as contemplated by the invention, preferably includes a supporting structure for the fenders and seat, which is sufficiently strong and so constructed and arranged that it may conveniently be used, if desired, to connect an implement thereto, such, for instance, as a push-type cultivator or an underslung plow.

Still another object of the invention is to provide an improved tractor rear assembly including fender and seat equipment, which is simple and compact in construction, conveniently assembled and disassembled, and which may be manufactured at relatively low costs.

These and other objects and advantages of the invention will be apparent from the following description of a preferred embodiment of the invention. Referring to the drawings accompanying and forming part of this specification, and in which like reference characters designate the same or similar parts in the various views:

Fig. 1 is a side view of a row-crop tractor, the left rear wheel and part of the rear axle structure at the left side of the tractor being omitted for a better disclosure of the rear part of the tractor;

Fig. 2 is a front view of the front axle structure of the tractor shown in Fig. 1;

Fig. 3 is a top view of the rear end of the tractor shown in Fig. 1, the propelling wheels, seat cushion, seat back and fenders being omitted in Fig. 3;

Fig. 4 is an enlarged detail view of an L-shaped support forming part of the rear axle structure of the tractor shown in Fig. 1;

Fig. 5 is a vertical section, on an enlarged scale, through part of the rear axle structure of the tractor shown in Fig. 1, the section being taken on line V—V of Fig. 3 and showing parts omitted in Fig. 1;

Fig. 6 is a view on line VI—VI of Fig. 5; and

Fig. 7 is a perspective rear view of the tractor shown in Fig. 1, the view being taken from a point rearwardly of and above the tractor.

Fig. 8 is a sectional view on line VIII—VIII of Fig. 1, showing parts including an L-shaped support at the left side of the tractor, which parts are omitted in Fig. 1.

Referring to Figs. 1, 2 and 7, axially spaced front wheels 1 and 2 of the tractor are mounted on opposite ends of an upwardly arched front axle 3 by means of steering knuckles 4 and 5, respectively. Upper arms of the steering knuckles are connected by a tie rod 6 which is also arched upwardly so as to leave the ground clearance afforded by the upwardly arched front axle 3 substantially unobstructed. A plate 7 is secured to the forward end of a motor block 8 by bolts (not shown) extending through bolt holes 7', and a pivot pin 9 secured to the plate 7 extends through the upper transverse portion of the front axle 3, permitting transverse rocking movement of the front axle relative to the motor block. A collar 10 secured to the pin 9 retains the front axle 3 against axial displacement on the pin 9. The motor block 8 forms part of an internal combustion engine which is of generally conventional design and therefore requires no detailed description, the crank shaft 11 of the internal combustion engine being indicated in dotted lines in Fig. 1. A radiator and shell 12 are supportingly connected with the motor block by a suitable bracket structure (not shown), and a hood 13 is supported at its forward end on the radiator shell 12. A bottom opening of the motor block 8 is closed by an oil pan 14.

Secured to the rear of the motor block 8 by means of bolts 15 is a torque tube casing 16 which comprises a rearwardly tapering bell housing immediately adjacent to the motor, and a relatively long tubular portion extending rearwardly from the bell housing. The long tubular portion of the torque tube casing, which is relatively narrow transversely of the tractor, has a downward enlargement at its rear end as shown in Fig. 1, and the portion of the torque tube casing extending between the bell housing and the rearward enlargement has a height substantially equal to its width, as may be seen from Figs. 1 and 7.

A gear casing 17 shown in Figs. 1 and 3, is secured to the rear end of the torque tube casing 16, studs 18 secured in the gear casing 17 projecting forwardly through a flange 19 of the torque tube casing 16, and nuts being screwed upon the studs to hold the torque tube casing 16 and gear casing 17 rigidly together. The two casings 16 and 17 form a housing which extends longitudinally of the tractor, the transverse width of the gear casing 17 being somewhat larger than the transverse width of the tubular portion of the torque tube casing 16, as may be seen from Fig. 3.

The gear casing 17 forms the central part of an upwardly arched rear axle structure which extends transversely of the tractor and on which the rear wheels 20 and 21 of the tractor are mounted. Secured to each side of the gear casing 17 is an L-shaped support comprising a horizontal hollow arm 22 shown in Figs. 3 and 5, and a depending casing portion 23 shown in Figs. 1, 4 and 8. The arms 22 of the L-shaped supports are bolted to opposite sides of the gear casing 17 and extend laterally from the rear portion thereof, and the rear wheels 20 and 21 are mounted on the depending casing portions 23 of the L-supports, each depending casing portion having an opening 24 (Fig. 8) in which a supporting axle for the respective rear wheel is mounted, as indicated at 25 in Figs. 1 and 8. The casing portion 23 of each L-support is closed at the bottom by a cover 26, as shown in Fig. 1.

Power is transmitted from the forward engine unit including the crank shaft 11, to the rear wheels 20 and 21 by suitable mechanism including a clutch 27 within the bell housing of the torque tube casing 16; a propeller shaft 28 extending through the torque tube casing and connectable with and disconnectable from the crank shaft 11 by the clutch 27; change speed mechanism within the forward portion of the gear casing 17 drivingly connected with the propeller shaft 28 and operable by a gear shift lever 29; differential gearing 106 (Fig. 8) enclosed within the rear portion of the gear casing 17; a pair of drive shafts 30 connected with the differential gearing and extending through the arms 22, respectively, of the L-supports; one drive shaft which extends through the arm 22 of the L-support at the left side of the casing 17 being shown in Figs. 5 and 8; and final drive gearing 107 (Fig. 8) enclosed within the casing portions 23 and connecting the drive shafts 30 with the axles of the wheels 20 and 21 at opposite sides, respectively, of the tractor. Each of the L-supports has a pair of bearing openings 31, in which the outer end of the respective drive shaft 30 is journaled, and the horizontal arm 22 of each L-support is enlarged near the depending casing 23 to form a brake compartment 32 which has an opening 33 at the top of the arm 22, as best shown in Fig. 4.

Enclosed within the brake compartment 32 of the L-support at the left side of the tractor is a brake drum 34 which is non-rotatably secured to the shaft 30 by means of a key 93 and a set screw 94 as shown in Figs. 5 and 6. A brake band 35 for cooperation with the brake drum 34 is anchored at one end on a pin 95 which is supported at its ends on the left L-support in a pair of alined holes one of which is indicated at 96 in Fig. 4. Another pin 97, forwardly of the pin 95, is likewise supported in a pair of alined holes one of which is indicated at 98 in Fig. 4, and a rocker 99 carrying a brake lever 36 is pivotally mounted on the pin 97 within the upper part of the brake compartment 32. The rocker 99 has a bifurcated portion which carries a pin 100, and a rod 101 extends at right angles to the axis of the pin 100 through a diametrical bore of the latter between the wings of the bifurcated portions of the rocker 99. The rod 101 is secured to the free end of the brake band 35 and has a threaded portion projecting beyond the pin 100, which threaded portion carries a pair of nuts 102 for retaining the rod 101 against sliding movement out of the pin 100 in one direction. A spring 103 is hooked at one end over the free end of the rod 101, and the other end of the spring 103 is anchored on the forward wall of the brake compartment 32, the spring 103 being initially tensioned to exert a permanent pull on the rod 101 which pull tends to swing the rocker 99 and brake lever 36 in a clockwise or forward direction, as viewed in Fig. 6, about the pin 97.

In order to brake the left rear wheel of the tractor the operator takes hold of the brake lever 36 and pulls it in an anticlockwise or rearward direction, as viewed in Fig. 6, which movement of the hand lever 36 is transmitted to the rod 101 due to engagement of the pin 100 with the adjacent nut 102, and the resulting pull on the rod 101 causes the brake band 35 to be tightened on the brake drum 34. After the brake band has been tightened to the desired extent the lever 36 may be locked against forward swinging movement by means of a latch 92 which is pivoted at 104 on a stud 45 projecting upwardly from the left L-support near the forward edge of the top opening 33. The brake lever 36 has a series of circumferential grooves 105, and in order to lock the lever 36 after the brake has been tightened the latch 92 is swung by hand about its pivot center 104 in a rearward direction so as to engage its free end with one of the circumferential grooves 105. Fig. 6 shows the latch 92 in position to lock the brake lever 36. In order to unlock the brake lever 36 the operator may first relieve the load on the latch 92 by rearward pull on the lever 36, and he may then swing the latch 92 forwardly about its pivot center 104 into a position where it is out of the path of movement of the lever 36.

The brake mechanism for the left rear wheel of the tractor, which has been described hereinbefore is duplicated at the right side of the tractor for braking the right rear wheel, that is, the right L-support has a brake compartment 32 as shown in Fig. 3, which encloses a brake drum, brake band and operating mechanism of the same construction as has been described hereinbefore in connection with the brake compartment 32 of the left L-support. A brake lever 37 (Figs. 1 and 7) corresponding to the brake lever 36 extends upwardly from the right L-support, and the brake mechanism at the right side of the tractor is so arranged that its brake band will be tightened by rearward pull on the hand lever 37. The right and left brake mechanisms are independent of each other, and either one may be operated to facilitate short turning, or both may be operated simultaneously for stopping the tractor, in conformity with established practice.

A transverse tubular bar 38 of square cross-section as shown in Fig. 1 extends through a square opening in the downward enlargement at the rear end of the torque tube casing 16, the downward enlargement being at the under side of the torque tube casing, and the transverse bar being drawn into the upper rearward corner of the square opening by two diagonal bolts 39, one at each side of the downward enlargement of the torque tube casing 16. A clip 40 is interposed between the bar 38 and the head of the bolt 39, as shown in Fig. 1, to provide a proper seat for the head of the bolt 39 at the left side of the tractor laterally of the downward enlargement of the torque tube casing 16, and the shank of said bolts extends diagonally through the bar 38 and is screwed into a tapped lug 41 projecting laterally from the left side wall of the downward enlargement of the casing 16. The other bolt 39 which extends diagonally through the bar 38 at the right side of the tractor is arranged in the same manner as has just been described in connection with the bolt 39 at the left side of the tractor. The transverse bar 38 is located forwardly of the arms 22 of the L-supports, and it will be noted from Fig. 3 that the portion of the bar 38 which extends from the left side of the torque tube casing 16 terminates in front of the brake compartment 32 of the arm 22 at the left side of the tractor, while the portion of the bar 38 which extends from the right side of the torque tube casing 16 terminates in front of the brake compartment 32 of the arm 22 at the right side of the tractor. The square opening in the downward enlargement of the torque tube casing 16 through which the transverse bar 38 extends, is sufficiently large to permit ready axial movement of the bar 38 for purposes of assembly prior to the installation of the bolts 39.

A longitudinal beam 42 extends transversely of the arm 22 of the L-support at the right side of the tractor in laterally spaced relation to the gear casing 17, and a similar beam 43 which is laterally spaced from the gear casing 17 at the left side of the tractor extends transversely of the arm 22 of the left L-support. As shown in Figs. 5 and 6 the beam 43 is made of angle iron and it is mounted on top of the arm 22, the horizontal flange of the angle iron extending over the top opening 33 of the brake compartment 32 and being secured in position on the arm 22 by a bolt 44 and by the stud 45. The stud 45 is screwed into a tapped lug formed on the forward wall of the brake compartment 32, and a nut 45' is screwed upon the stud 45 to hold the beam 43 down. An opening 46 (Fig. 3) in the horizontal flange of the beam 43 registers with the top opening 33 of the brake compartment 32 to accommodate the brake lever 36 and part of the mechanism connected therewith, as shown in Fig. 6. A sheet metal cover 91 for the opening 46 is held in place by the bolt 44 and by the stud 45 and nut 45'. The beam 42, like the beam 43, is made of angle iron, and the beam 42 is mounted on the arm 22 of the right L-support in the same manner as has just been described in connection with the beam 43. That is, the beam 42 is secured to the right L-support by a bolt 47 and a stud 48 corresponding to the bolt 44 and stud 45, and it has an aperture 49 in its horizontal flange corresponding to the aperture 46 of the beam 43, the aperture 49 accommodating the brake lever 37 shown in Figs. 1 and 7.

The beams 42 and 43 extend forwardly from the respective arms 22 of the L-supports in a horizontal direction approximately up to the vertical plane of the flange 19 at the rear of the torque tube casing 16. The portions of the beams extending forwardly from said plane are curved downwardly, as shown for the beam 42 in Fig. 1, and the lower end of the downwardly curved portion of the beam 42 is secured to the outer end of the transverse bar 38 at the right side of the tractor by a bolt and nut 50, while the lower end of the downwardly curved portion of the beam 43 is secured to the outer end of the transverse bar 38 at the left side of the tractor by a bolt and nut 51. The vertical side flange of the beam 42 is spaced from the vertical side flange of the beam 43 a distance slightly greater than the length of the transverse bar 38, the bar 38 being inserted between said vertical side flanges at the lower ends of the downwardly curved portions of the beams 42 and 43, and the vertical rear wall of the transverse bar 38 contacting the vertical transverse flange portions which extend inwardly from the vertical side flanges at the forward ends of the beams 42 and 43. The bolts 50 and 51 extend horizontally through the transverse bar 38 and through the mentioned inwardly extending vertical flange portions of the beams 42 and 43, respectively.

Each of the beams 42 and 43 also has a rear portion which extends horizontally in the longitudinal direction of the tractor rearwardly from the horizontal arm 22 of the respective L-support. Fitted between the vertical side flanges of the beams 42 and 43 rearwardly of the arms 22 of the L-supports, is a seat frame comprising a pair of transverse angle bars 52 and 53, and a pair of longitudinal angle bars 54 and 55, the transverse bars 52 and 53 having upstanding front and rear flanges, respectively, and the longitudinal bars 54 and 55 having horizontal flanges secured to the horizontal flanges of the transverse bars 52 and 53 from below at the opposite ends of the latter. The downwardly extending side flange of the longitudinal bar 54 is secured to the vertical flange of the beam 42 by a pair of bolts 56, and the downwardly extending side flange of the longitudinal bar 55 is secured to the vertical flange of the beam 43 by a pair of bolts 57. A seat cushion 58 rests on the horizontal flanges of the transverse bars 52 and 53, as shown in Fig. 1, the seat cushion being retained against forward or backward sliding movement by the upstanding front and rear flanges of the transverse bars 52 and 53, respectively. The seat cushion is of considerable width transversely, of the tractor, as shown in Fig. 7, the width of the seat cushion being substantially equal to the transverse spacing between the vertical flanges of the beams 42 and 43. A back rest 59 is secured to a pair of spring arms 60 which are secured to the transverse frame bars 52 and 53 from below, as shown in Figs. 1, 3 and 7.

The horizontal flanges of the beams 42 and 43 extend in a horizontal plane substantially above the axis of the rear wheels 20 and 21, and the rear wheels extend upwardly beyond said plane, or in other words, the mentioned plane extends horizontally below the tops of the rear wheels, as may be seen from Figs. 1 and 7. Secured to the beams 42 and 43, respectively, are stub fenders 61 and 62 shown in Fig. 7, and the relation of the fender 62 to the mentioned plane as indicated in Fig. 1 is the same as the relation of the fender 61 to said plane. Each fender has a bottom portion which extends along the respective beam 42 or 43 on which it is mounted, from front to rear, and the bottom edge of each fender includes a relatively long straight and horizontal portion extending in proximity of the mentioned plane. At the front, the bottom portion of the fender extends approximately to a point laterally of the intersection of the periphery of the respective rear wheel 20 or 21 with the mentioned horizontal plane, and at the rear the bottom portion of the fender extends beyond the periphery of the respective rear wheel as shown in Fig. 1. A major portion of the fender above its bottom portion is curved away from the vertical plane of the upstanding angle iron flange to which the fender bottom is secured, the curvature being in the direction towards the respective propelling wheel 20 or 21, as clearly shown in Fig. 7. The bolts 56 and 57 which secure the seat frame to the beams 42 and 43 also pass through the bottom portions of the fenders, additional bolts 63 (Fig. 6) being provided to hold the fenders securely in position on the vertical flanges of the beams 42 and 43. Stay clips 64 are welded to the insides of the fenders facing the wheels and extend over the vertical flanges of the beams 42 and 43 as indicated in Figs. 5 and 6.

It will be seen that the beams 42 and 43 and the transverse tubular bar 38 provide a very rigid and substantial framework which is not only strong enough to securely support the operator's seat and the fenders, but which may also be utilized to attach implements to the tractor such as a push-type cultivator or an underslung plow. A push-type cultivator attachment, for instance, may be connected at its rear with the tubular bar 38 and at the front with the bell housing of the torque tube casing 16, mounting pads 65 and threaded bolt holes 66 in the mounting pads, shown in Fig. 1, being provided at opposite sides of the bell housing for securing implement supports thereto. An underslung plow attachment may be connected at its forward end to the transverse bar 38 and at a rearward portion to the rear ends of the angle iron beams 42 and 43.

A trailing vehicle or drawn-behind implement, such as a wheeled plow, a harrow, or the like, are preferably hitched to a drawbar 67 shown in Figs. 1 and 7, the drawbar having opposite side arms connected at their forward ends with the inner side walls of the final drive casings 23 of the L-supports at opposite sides of the arched rear axle structure. The drawbar is pivotally adjustable up and down about pivot pins 68, each pivot pin 68 being secured to one end of a latch 69 which has a bolt hole at its other end. The pivot pin secured to the latch 69 extends through a hole in the side arm of the drawbar into the side wall of the respective final drive casing, and a bolt 70 extending through the bolt hole of the latch 69 and through one of a series of holes 71 in the side arm of the drawbar is screwed into the side wall of the respective final drive casing.

A power take-off mechanism 72 including a belt pulley 73 is secured to the rear of the gear casing 17, and it should be noted that the driver's seat including the cushion 58 extends rearwardly from the rear axle structure over the power take-off mechanism, which is a desirable arrangement because it places the power take-off mechanism in a location where it is out of the way of the driver.

The front wheels 1 and 2 of the tractor are connected through suitable linkage including a reach rod 74 with a steering arm 75 at the left side of the tractor. The steering arm 75 is supported on a transverse shaft extending laterally from a steering gear casing 76 which is mounted on top of the torque tube casing 16, and a steering column 77 extends rearwardly and upwardly from the steering gear casing 76 and is supported forwardly of its rear end on a post 78 which is secured in the rear end of the torque tube casing 16. A steering wheel 79 at the rear end of the steering column 77 is arranged within easy reach of a driver seated on the cushion 58, the center of the steering wheel 79 lying in the longitudinal plane of symmetry of the tractor, as shown in Fig. 7. It should be noted that the brake levers 36 and 37, the gear shift lever 29, and a clutch pedal 80 pivoted at 81 at the left side of the torque tube casing 16 are also within easy reach of a driver seated on cushion 58. The clutch pedal 80 is connected with the clutch 27 by an actuating rod 82 which is pivoted on the clutch pedal at 83. Also pivoted on the clutch pedal 80 at 83 is a latch 84 which may be swung manually into engagement with the transverse bar 38 when the clutch pedal is depressed and it is desired to lock the clutch pedal in depressed position in order to hold the clutch 27 out of engagement.

A streamlined fuel tank 85 is mounted in an elevated position on the torque tube casing 16 by means of a bracket 86 and a sheet metal support 87. The bracket 86 is bolted at its forward end to the bell housing of the torque tube casing 16 and extends rearwardly under the fuel tank, the rear portion of the bracket being transversely enlarged to provide a seat of relatively large width transversely of the tractor. The fuel tank rests on the seat of the bracket 86 and is retained thereon by means of a metal strap 88 which is placed over the fuel tank and secured at its ends to the bracket 86. The sheet metal support 87 comprises a pair of parallel vertical side walls extending between the torque tube casing 16 and the bottom of the fuel tank 85; a rearwardly curved rear wall connects the side walls of the support with each other. The side walls of the support are secured to the torque tube casing 16 by screws 89, and the transverse width of the sheet metal support 87 is somewhat shorter than the width of the tubular portion of the torque tube casing 16, as may be seen from Fig. 7. A clip 90 secured to the bottom of the tank 85 rearwardly of the bracket 86 is fitted between the side walls of the sheet metal support and is secured thereto to sustain the fuel tank at its rear end and to prevent it from fore and aft tilting on the seat of the bracket 86.

A driver operating the tractor may take a position on the seat cushion 58 more or less directly behind the steering wheel 79 and, straddling the gear casing 17 and the rear end of the torque tube casing 16 with his feet, he may rest his right foot on the portion of the transverse bar which extends laterally from the torque tube casing 16 at the right side of the tractor, and his left foot on the portion of the bar 38 which extends from the torque tube casing 16 at the left side of the tractor. When so seated the driver will be entirely comfortable and he may drive the tractor conveniently in a sitting position. In the mentioned position the driver will also have a relatively wide range of vision of the ground ahead of him, which not only affords him a good view of the field at some distance ahead of the tractor, but also enables him to focus his eyes on a plant on the ground between the front wheels and to observe such plant while the tractor proceeds until the plant disappears under the cross bar 38 and under the rear axle structure. The plant, in order to be within the driver's range of vision, does not have to stand relatively close to the tread line of one or the other of the front wheels, but it may stand on a ground line extending longitudinally of the tractor centrally between the wheels, such a line being indicated by the dash-dotted line A in Fig. 7. Looking downwardly and forwardly from the seat along one side or the other of the tractor body forwardly of the rear axle structure, the driver will be able to observe a plant row on line A below the motor block 8 and the torque tube casing 16, and neither the fuel tank 85, nor the bracket 86 nor the sheet metal support 87 will interfere with such visibility of a plant row on line A. When seated directly centrally behind the steering wheel the driver has to move his head toward one side or the other in order to see line A below the motor and torque tube casing, but in doing so he does not have to lean over uncomfortably towards one side or otherwise assume a tiring position while driving the tractor. It will also be noted that the seat cushion 58 is relatively wide transversely of the tractor and that the driver may, if he wants to, move over from the central position behind the steering wheel either to the right or to the left in order to have plants on line A between the front and rear ends of the tractor under convenient observation. In other words, the driver may be seated on the cushion 58 between the wheels 20 and 21 in a laterally offset position relative to the gear casing 17. Since the driver's vision at the left side of the tractor is slightly obstructed by the reach rod 74 and steering arm 75 he will preferably look down at the right side of the tractor, and the seat cushion 58 is wide enough that he may move towards the right into a convenient position to observe the ground under the tractor from a point at the right side of a vertical plane through line A.

In the tractor described hereinabove the motor block 8 and the gear casing 17 are connected with each other by the torque tube casing 16 without the use of any auxiliary connecting members such as side channels at opposite sides of the tractor, and the tractor may, therefore, be termed a "frameless" type tractor. The term "frameless" is intended to indicate the absence of a frame, such as side channels, for connecting the engine unit with the rear axle structure, but it is not intended to exclude other frame elements, for instance, a frame for mounting the motor on the front axle structure and for connecting the motor unit with the torque tube casing. The tractor herein shown and described is particularly adapted for work along a single plant row as indicated in Fig. 7 where the lines B and C indicate plant rows at opposite sides of the plant row A which is straddled by the tractor.

While in the foregoing a preferred embodiment of the invention has been shown and described, it should be understood that it is not intended to limit the invention to the details of construction herein shown and described, for various modifications within the scope of the claims may occur to persons skilled in the art.

It is claimed and desired to secure by Letters Patent:

1. In a tractor having a forward engine unit and a hollow body structure including a relatively long and narrow tubular member extending longitudinally in rear of said engine unit, the combination of a housing forming part of said hollow body structure in rear of said tubular member and having forward and rearward portions for enclosing change speed and differential gear mechanisms, respectively, of said tractor, rear wheel supporting arms extending laterally in opposite directions from said rearward portion of said housing, rear wheels mounted, respectively, on said supporting arms, an operator's seat in the space between the planes of said rear wheels having a seating surface in rear of and above said tubular member, and a transverse bar mounted on said hollow body structure and extending laterally therefrom in advance of said differential gear housing below the level of said seating surface and at such spacing from said seat that an operator occupying a sitting position on said seat may rest his feet on said transverse bar.

2. In a tractor having a forward engine unit and a hollow body structure including a relatively long and narrow tubular member extending longitudinally in rear of said engine unit, the combination of a housing forming part of said hollow body structure in rear of said tubular member and having forward and rearward portions for enclosing change speed and differential gear mechanisms, respectively, of said tractor, rear wheel supporting arms extending laterally in opposite directions from said rearward portion of said housing, rear wheels mounted, respectively, on said supporting arms, an operator's seat in the space between the planes of said rear wheels having a seating surface in rear of and above said supporting arms of such width transversely of the tractor that an operator may optionally seat himself thereon in a central position between said rear wheels and in laterally offset positions at either side of said central position, supporting means for said seat including a pair of beams mounted on said supporting arms, respectively, in position to extend transversely thereof, and a transverse bar connecting forward portions of said beams in advance of said supporting arms, said transverse bar being mounted on said hollow body structure below the level of said seating surface at such spacing from said seat that an operator occupying said central and lateral positions may rest his feet on said transverse bar.

3. In a tractor having a forward engine unit, a rear axle structure including a gear casing and a pair of ground wheels at opposite sides of said gear casing, a relatively long and narrow tubular member connecting said engine unit with said gear casing, an operator's seat in the space between the planes of said ground wheels having a seating surface rearwardly of and above said gear casing, and a transverse bar forwardly of said gear casing, below the level of said seating surface and at such spacing from said seat that an operator occupying a sitting position on said seat may rest his feet on said transverse bar.

4. In a tractor having a forward engine unit; a rear axle structure including a gear casing, a pair of arms extending transversely of said gear casing at opposite sides thereof, and a pair of ground wheels at the outer ends of said arms; a relatively long and narrow tubular member connecting said engine unit with said gear casing; an operator's seat in the space between the planes of said ground wheels having a seating surface rearwardly of and above said gear casing; and a horizontal bar extending transversely of said tubular member in advance of said gear casing, below the level of said seating surface and at such spacing from said seat that an operator occupying a sitting position on said seat may rest his feet at opposite sides of said gear casing on said transverse bar.

5. In a tractor having a forward engine unit; a rear axle structure including a gear casing, a pair of arms extending transversely of said gear casing at opposite sides thereof, and a pair of ground wheels at the outer ends, respectively, of said arms; a relatively long and narrow tubular member connecting said engine unit with said gear casing; a pair of beams mounted on said arms at opposite sides, respectively, of said gear casing, and each extending forwardly and rearwardly of said arms; an operator's seat mounted on the rearwardly extending portions of said longitudinal beams and having a seating surface rearwardly of and above said arms; and a transverse bar connecting said longitudinal beams forwardly of said arms, said transverse bar being positioned below the level of said seating surface and at such spacing from said seat that an operator occupying a sitting position on said seat may rest his feet on said transverse bar.

6. In a tractor having a forward engine unit; a rear axle structure including a gear casing, a pair of arms extending transversely of said gear casing at opposite sides thereof, and a pair of ground wheels at the outer ends, respectively, of said arms; a relatively long and narrow tubular member connecting said engine unit with said gear casing; a pair of beams mounted on said arms at opposite sides, respectively, of said gear casing, and each extending forwardly and rearwardly of said arms; an operator's seat mounted on the rearwardly extending portions of said beams and having a seating surface rearwardly of and above said arms; and a transverse bar mounted in a transverse opening of said tubular member in advance of said gear casing, said transverse bar being connected at its opposite ends to said beams and being positioned below the level of said seating surface and at such spacing from said seat that an operator occupying a sitting position on said seat may rest his feet on said transverse bar.

7. In a tractor having a forward engine unit; a rear axle structure including a gear casing, a pair of arms extending transversely of said gear casing at opposite sides thereof, and a pair of ground wheels at the outer ends, respectively, of said arms; a relatively long and narrow tubular member connecting said engine unit with said gear casing; a pair of beams mounted on top of said arms at opposite sides, respectively, of said gear casing, each of said beams having a rearward portion in rear of said arms and a downwardly curved portion in advance of said arms; an operator's seat mounted on said rearward portions of said beams and having a seating surface rearwardly of and above said arms; and a transverse bar mounted on said tubular member, secured at its opposite ends to said downwardly curved portions of said beams, said transverse bar being positioned below the level of said seating surface and at such spacing from said seat that an operator occupying a sitting position on said seat may rest his feet on said transverse bar.

8. In a tractor having a forward engine unit, a rear axle structure including a gear casing, a pair of arms extending transversely of said gear casing at opposite sides thereof, and a pair of ground wheels at the outer ends, respectively, of said arms; a relatively long and narrow tubular member connecting said engine unit with said gear casing; a pair of beams mounted on top of said arms at opposite sides, respectively, of said gear casing, said beams extending horizontally and parallel to each other forwardly and rearwardly from said arms and each having a downwardly curved portion in advance of said arms; an operator's seat mounted on and extending transversely between said beams; a pair of fenders for said ground wheels, mounted respectively on said beams at opposite ends of said seat; and a transverse bar mounted on said tubular member, secured at its opposite ends to said downwardly curved portions of said beams, said transverse bar being positioned below the level of said seating surface of said seat and at such spacing forwardly therefrom, that an operator occupying a sitting position on said seat may rest his feet on said transverse bar.

9. In a tractor, a forward engine unit; a wheeled front support for said engine unit; a rear support comprising a pair of axially spaced rear wheels, a gear casing between said rear wheels, means including a transverse arm supportingly connecting one of said rear wheels with said gear casing in laterally spaced relation thereto, and means supportingly connecting the other of said rear wheels with said gear casing; a torque tube casing supportingly connecting said engine unit with said gear casing and having a circumferential wall portion forming a tubular member of substantial length longitudinally of the tractor and of relatively short width transversely of the tractor, between said engine unit and said gear casing; means drivingly connecting said engine unit with said rear wheels including change speed and differential mechanisms within said gear casing, and a propeller shaft within said torque tube casing for transmitting power from said engine unit to said change speed mechanism; an operator's seat in the space between the planes of said rear wheels having a seating surface rearwardly of and above the axis of said arm, on which an operator may seat himself in a laterally offset position relative to said torque tube casing towards said one rear wheel, and an element extending transversely of said torque tube casing in advance of the axis of said arm, forwardly of and below said seat at such spacing therefrom that an operator seated on said seat in said offset position may rest his feet on said transverse element.

CONRAD E. FRUDDEN.
WALTER F. STREHLOW.